United States Patent
Kondou et al.

[11] Patent Number: 5,157,672
[45] Date of Patent: Oct. 20, 1992

[54] INTERFERENCE DETECTION APPARATUS FOR USE IN DIGITAL MOBILE COMMUNICATIONS SYSTEM

[75] Inventors: Seiji Kondou; Yoshihisa Isoda; Hiroyasu Muto, all of Tokyo, Japan

[73] Assignee: NEC Corporation, Tokyo, Japan

[21] Appl. No.: 493,463

[22] Filed: Mar. 14, 1990

[30] Foreign Application Priority Data

Mar. 15, 1989 [JP]  Japan .................................. 1-62857
Apr. 20, 1989 [JP]  Japan ................................. 1-100616

[51] Int. Cl.$^5$ .......................... G06F 11/10; H04B 7/8
[52] U.S. Cl. ........................................ 371/43; 371/41; 455/134; 455/135
[58] Field of Search ........................ 371/43, 44, 45, 41, 371/5.5; 375/40, 99, 100; 455/50, 63, 134, 135, 277, 297

[56] References Cited

U.S. PATENT DOCUMENTS

| | | | |
|---|---|---|---|
| 4,633,519 | 12/1986 | Gotoh | 455/277 |
| 4,823,398 | 4/1989 | Hashimoto | 455/134 |
| 4,862,483 | 8/1989 | Clark | 375/94 |
| 4,884,272 | 11/1989 | McConnell | 371/43 |
| 4,922,507 | 5/1990 | Simon et al. | 375/26 |
| 4,932,029 | 6/1990 | Heichler | 371/43 |
| 4,941,154 | 7/1990 | Wei | 375/39 |
| 4,945,549 | 7/1990 | Simon et al. | 375/53 |
| 4,967,413 | 10/1990 | Otani | 371/43 |
| 4,977,615 | 12/1990 | Suzuki et al. | 455/277 |

*Primary Examiner*—Charles E. Atkinson

[57] ABSTRACT

An apparatus comprising a Viterbi decoder which decodes received convolutional code data in accordance with the Viterbi algorithm and provides path metrics. Among the path metrics, a path metric comparator detects the maximum and minimum path metrics for each data symbol. The path metric comparator selects the minimum difference among differences between the maximum and minimum path metrics. An apparatus also comprises a field strength detector which detects the electromagnetic field strength of a radio signal containing the convolutional code data. Upon the minimum path metric difference and the field strength, an interference detector checks if interference exists in the radio signal. The minimum path metric difference may be used for an antenna diversity system.

28 Claims, 7 Drawing Sheets

FIG. 4A RECEIVED DATA

FIG. 4B DECODED DATA

FIG. 4C HEADER DETECT PULSE

INTERFERENCE DETECTION APPARATUS FOR USE IN DIGITAL MOBILE COMMUNICATIONS SYSTEM

BACKGROUND OF THE INVENTION

The present invention relates to an interference detection apparatus and, more particularly, to an interference detection apparatus for use in a digital mobile communications system.

To detect co-channel interference, a conventional apparatus uses a beat phenomenon caused by an interference wave. A reference is made to a paper entitled "A new method of co-channel D/U measurement using squared-law envelope differential detection", vol. 83, No. 3, IEICE Technical Report, by Kozono et al 1983. By detecting and processing a received signal envelope, the apparatus obtains the average power of the received signal and power of the beat component. Based on the obtained powers, the apparatus calculates a desired signal level-to-undesired signal level (D/U) ratio. If the D/U ratio falls below a predetermined level, the apparatus determines that interference exists.

Quality of such an interference detection depends on the linearity of the envelope detector. Thus, if manufacturing errors in the envelope detector occur, they deteriorate the interference detection quality. In addition, the conventional apparatus needs a relatively long time to detect interference, because obtaining the D/U ratio involves a complicated calculation. This detection delay adversely affects communications.

SUMMARY OF THE INVENTION

An object of the present invention is, therefore, to provide a generally improved interference detection apparatus which eliminates the above-mentioned problems.

Another object of the present invention is to provide an interference detection apparatus having a high detection quality.

Yet another object of the present invention is to provide an interference detection apparatus capable of detecting interference for a relatively short period.

A further object of the present invention is to provide an interference detection apparatus suitable for a digital mobile communications system.

Yet a further object of the present invention is to provide an interference detection apparatus applicable to an antenna diversity system.

According to the present invention, there is provided an interference detection apparatus comprising a receive section which receives and demodulates a radio signal including data of convolutional codes. A Viterbi decoder decodes the demodulated data in accordance with the Viterbi algorithm and provides path metrics for the convolutional codes. In response to the path metrics, a path metric comparator selects a minimum difference among differences between maximum ones of the path metrics and minimum ones of the path metrics. By using the minimum difference, an interference detector determines a signal quality of the radio signal. The signal quality may be used for detecting interference existing in the radio signal. Alternatively, the signal quality may be used for an antenna diversity system.

BRIEF DESCRIPTION OF THE DRAWINGS

The above and other object, features and advantages of the present invention will become more apparent from the following description with reference to the accompanying drawings, in which.

DETAILED DESCRIPTION OF THE PREFERRED EMBODIMENTS

Figure 1:
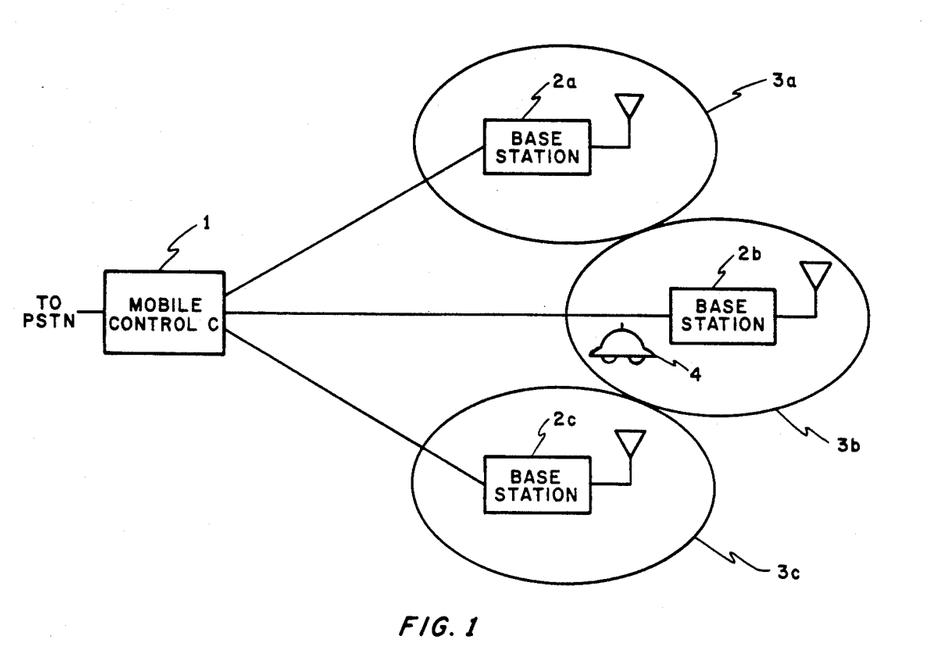
FIG. 1 is a schematic diagram showing a mobile communications system to which the present invention is applicable.

In FIG. 1, a mobile communications system includes a mobile control center 1 connected to a public switched telephone network (PSTN) and to mobile base stations 2a to 2c through wired lines. The base stations 2a to 2c have coverage areas 3a to 3c, respectively, and are to be connected to a mobile subscriber station (MSS) 4 through radio channels. Only one MSS is shown but a plurality of MSSs may be included in the system.

An interference detection apparatus according to the present invention may be installed in either MSS 4 or the mobile base station 2a, 2b, 2c. If an interference detection apparatus which is installed in the base station 2b detects interference, the base station 2b changes a communications channel used for communicating with MSS 4 to another communications channel. If an interference detection apparatus which is installed in MSS 4 detects interference, the apparatus informs the base station 2b of the interference detection. In response, the base station 2b changes its communications channel used for communicating with MSS 4 to another channel and transmits a channel designate signal to MSS 4 to cause MSS to change its channel to the another channel. It is to be noted that interference may be interference waves illegally produced from unidentified signal sources.

Figure 2:
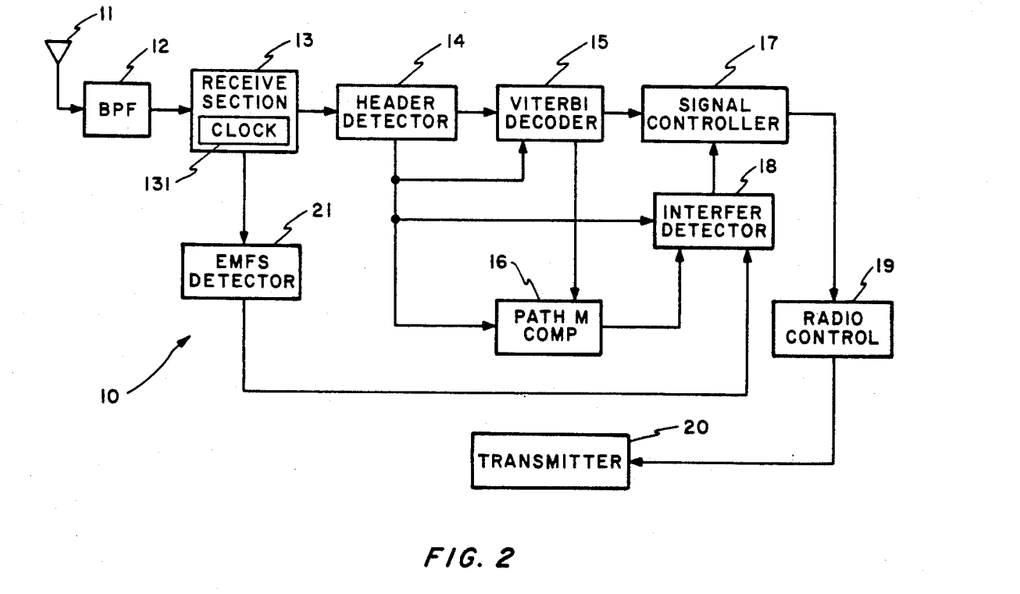
FIG. 2 is a block diagram showing an interference detection apparatus embodying the present invention.

In FIG. 2, an interference detection apparatus 10 includes an antenna 11 picking up a radio signal which may contain convolutionally coded data. The antenna 11 provides the radio signal to a receive section 13 through a band-pass filter (BPF) 12. The receive section 13 demodulates the radio signal to produce baseband data and provide the data to a header detecter 14. The receive section 13 includes a conventional clock recovery circuit 13 which provides necessary timings to various parts of the apparatus 10. The receive section 13 also includes a conventional function to change it radio channel in response to a channel change signal provided from a radio control circuit 19. The receive section 13 provides an intermediate frequency (IF) signal to an electromagnetic field strength (EMFS) detector 21.

EMFS detector 21 may be composed of a voltage comparator to detect the field strength of the received radio signal and provides the result to an interference detector 18. The header detector 14, which will be described in detail later, detects a header or start code contained in the baseband data to produce a header detect pulse. The header detect pulse activates a Viterbi decoder 15 and the interference detector 18 and is provided as a reset pulse to a path metric comparator 16.

Upon the header detect pulse, the Viterbi decoder 15 decodes the baseband data through the Viterbi algorithm and provides the decoded data to a signal controller 17. In the decoding algorithm, the Viterbi decoder 15 provides path metrics as well known in the art and provides them to the path metric comparator 16. The Viterbi algorithm is disclosed in "Digital Communications", pp. 295-298, written by John G. Proakis and published by McGraw Hill, Inc. 1983. The path metric comparator 16, which will be described in detail later, compares the path metrics with each other to detect the maximum and minimum path metrics among them for each data symbol. The comparator 16 then subtracts the minimum path metric from the maximum path metric to produce a maximum-minimum difference therebetween for each data symbol. The comparator 16 detects the minimum path metric difference $PMD_{MIN}$ from the maximum-minimum differences. The detected $PMD_{MIN}$ is provided to the interference detector 18. It should be noted that the $PMD_{MIN}$ has a very close relationship with the number of errors in the received data, i.e., with a signal quality of the received data, as shown in FIG. 8.

The interference detector 18, whose operation will be discussed in detail later, has two tables indicating a $PMD_{MIN}$ vs. number of bit errors characteristic shown in FIG. 8 and an electromagnetic field strength (Eb/No) vs. bit error ratio characteristic shown in FIG. 9. The FIG. 8 table has been obtained through a computer simulation. The FIG. 9 table has been obtained through a field test. Based on the minimum path metric difference $PMD_{MIN}$ and the field strength respectively provided from the path metric comparator 16 and EMFS detector 21, the interference detector 18 determines bit error ratios (BERs) from the FIG. 8 and 9 tables to see if there is interference.

Figure 8:
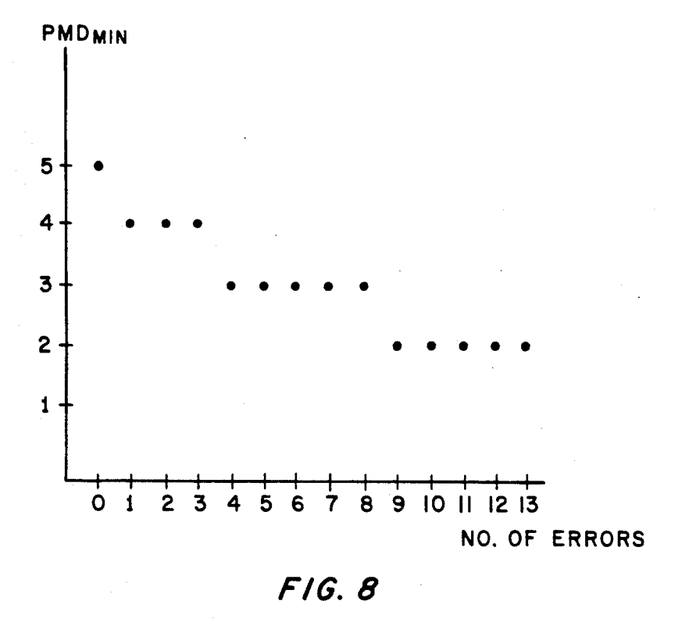
FIG. 8 is a graph showing a path metric vs. bit errors characteristic.
Figure 9:
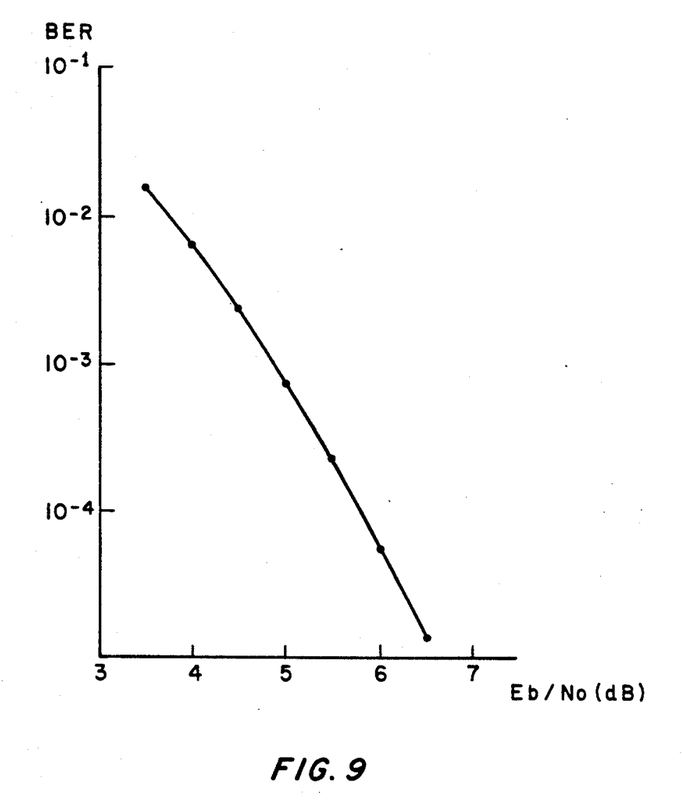
FIG. 9 is a graph showing an electromagnetic field strength vs. bit error ratio characteristic.

More specifically, if BER determined from the FIG. 8 table, i.e., from the signal quality is larger than that from the FIG. 9 table, the interference detector 18 determines that interference exists. Otherwise, the detector 18 determines that no interference exists. The determined result is provided to the signal controller 17.

If the determined result indicates that no interference exists, the signal controller 17 transfers the decoded data from the Viterbi decoder 15 to the radio control circuit 19. If, however, the determined result indicates that interference exists, the controller 17 informs the control circuit 19 of this interference existence and transfers the decoded data to the circuit 19.

When the interference detection apparatus 10 is installed in a mobile base station, the radio control circuit 19 provides a channel change signal to the receive section 13 and a transmitter 20 to change their communications channel to another channel in response to the interference existence. The transmitter 20 may be a conventional one having a function to change its channel in response to the channel change signal. Regardless of interference existence, the control circuit 19 provides the decoded data to a fixed telephone (not shown) through the PSTN.

When the apparatus 10 is installed in a mobile subscriber station, the radio control circuit 19 informs a mobile base station of the interference existence through the transmitter 20 in response the interference existence from the signal controller 17. In response, the mobile base station provides the mobile subscriber station with a channel designate signal indicating an unoccupied radio channel to be used for communications. By receiving the channel designate signal, the apparatus 10 in the mobile subscriber station controls the receive section 13 and transmitter 20 to tune them to the designated channel. Regardless of interference existence, the control circuit 19 provides the decoded data to a speaker (not shown), or the like.

Figure 3:
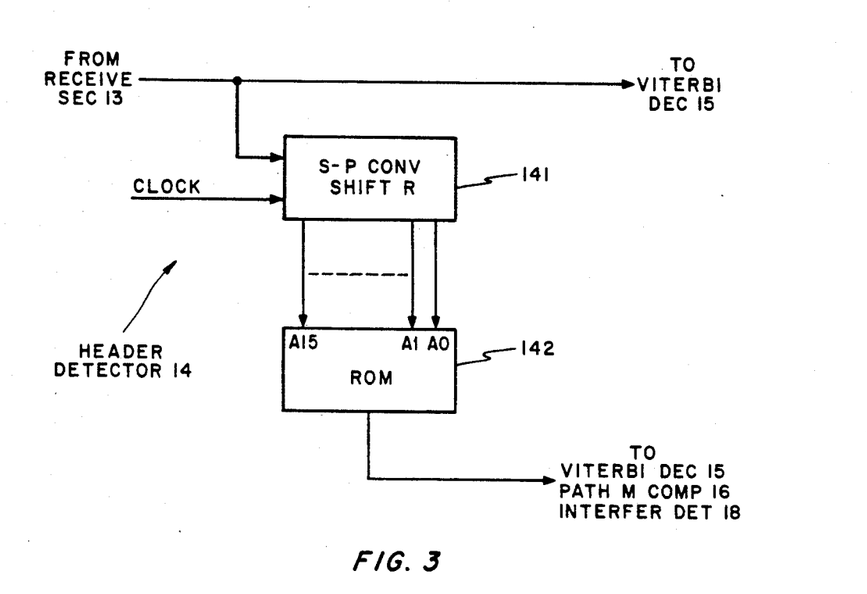
FIG. 3 is a block diagram showing a header detector of the FIG. 2 apparatus.

In FIG. 3, the header detector 14 is comprised of a serial-to-parallel (S-P) converter 141 and a read-only memory (ROM) 142. The S-P converter 141 is made of a sixteen-stage shift register which receives demodulated baseband data from the receive section 13 and a clock from the clock recovery circuit 131. The outputs of each stages of shift register 141 are respectively applied to the address terminals of ROM 142. ROM 142 stores in advance data which is read therefrom in response to either the start code of 16 bits (see FIG. 4A) or a one-error containing code that is similar to the start code but different from the start code by one bit. If the received data includes either the start or one-error containing code, ROM 142 produces a header detect pulse (FIG. 4C) and provides the pulse to the Viterbi decoder 15, path metric comparator 16 and interference detector 18.

Figure 4A:
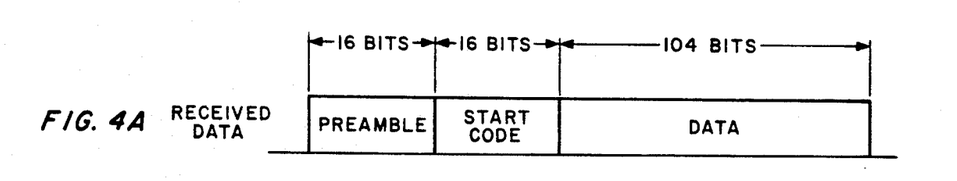
FIGS. 4A to 4C show received data, decoded data and a header detect pulse, respectively.
Figure 4B:
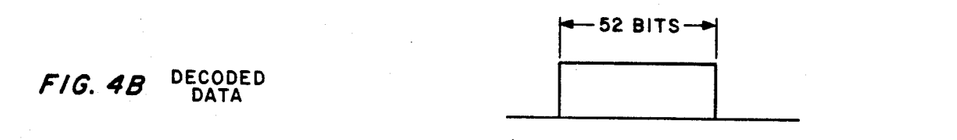
Figure 4C:
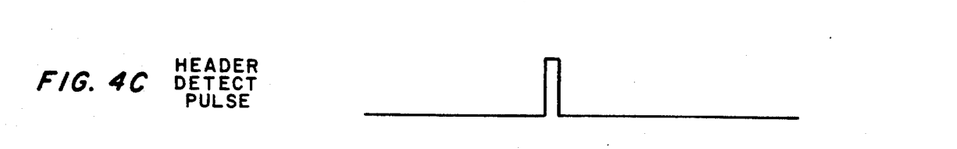

FIG. 4A shows a received data which is convolutionally coded with code rate ½ and constraint length 5 and has a preamble of 16 bits, a start or header code of 16 bits and data of 104 bits. Since the code rate is ½, a decoded data has 52 bits, as shown in FIG. 4B. In FIG. 4C, the header detect pulse provided by the header detector 14 (FIG. 3) appears at the end of the start code. The Viterbi decoder 15 decodes the FIG. 4A data to produce the FIG. 4B data and during the Viterbi algorithm produces 16 path metrics. Reference should be made to the above-mentioned Proakis book.

Figure 5:
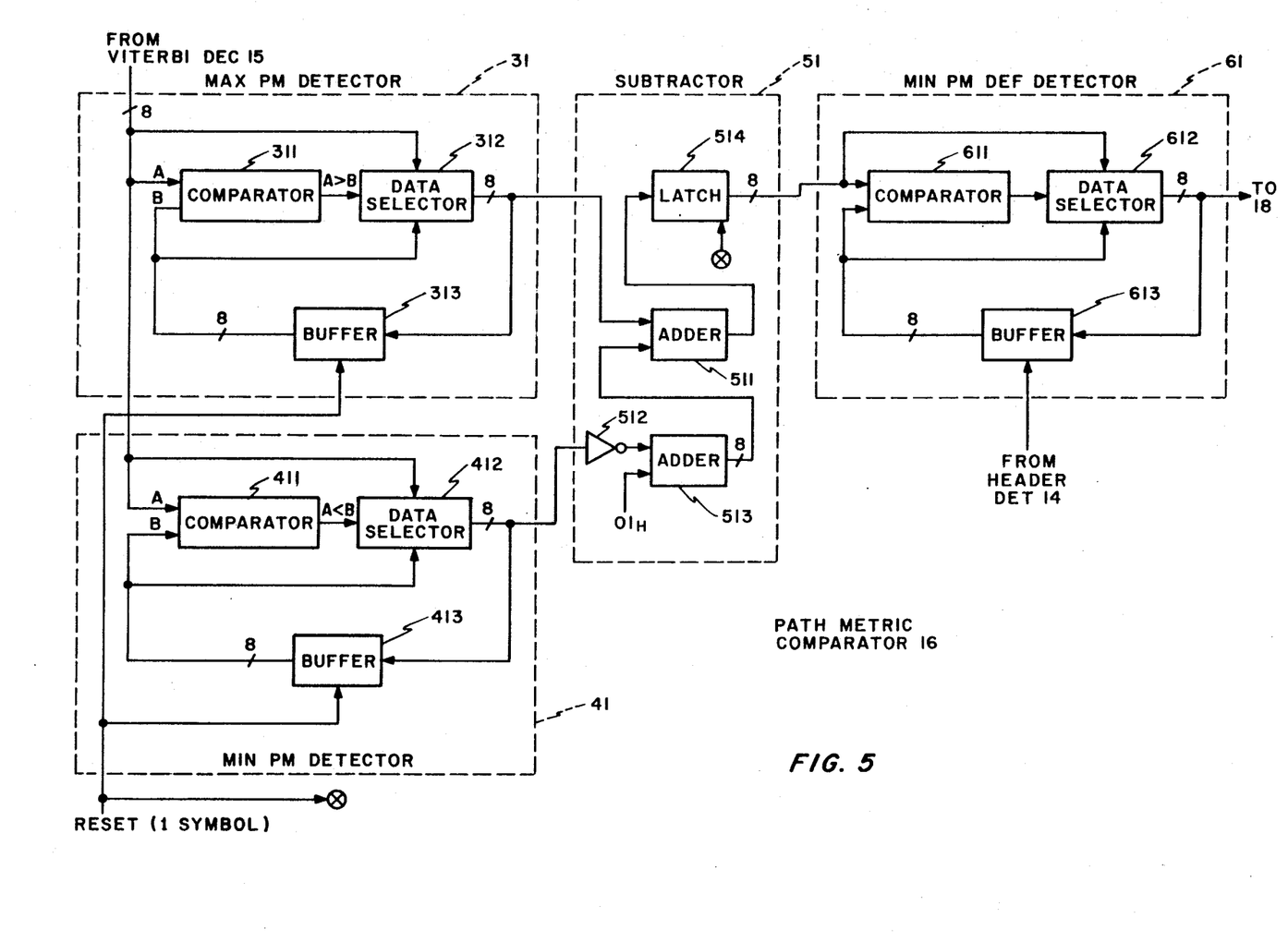
FIG. 5 is a block diagram showing a path metric comparator of the FIG. 2 apparatus.

In FIG. 5, the path metric comparator 16 comprises a maximum path metric detector 31, a minimum path metric detector 41, a subtractor 51 and a minimum path metric difference detector 61. The maximum path metric detector 31 is composed of an 8-bit magnitude comparator 311, a data selector 312 and a buffer 313. The comparator 311 compares the path metric A from the Viterbi decoder 15 and the output B of buffer 313. If the path metric A is greater than the output B (A>B), the comparator 311 outputs a control signal indicating A>B to cause the data selector 312 to select the path metric A. Otherwise, the comparator 311 outputs a control signal indicating A<B to cause the data selector 312 to select the buffer output B. The selected output is latched by the buffer 313. The buffer 313 is reset by a reset pulse provided from the clock recovery circuit 131 per data symbol to be loaded with the minimum value $00_H$ (00000000). Thus, the maximum path metric detector 31 detects the maximum path metric for each data symbol.

Similarly, the minimum path metric detector 41 is composed of an 8-bit magnitude comparator 411, a data selector 412 and a buffer 413. The data selector 412 selects the smaller one of data A and B in response to the output of magnitude comparator 411. The buffer 413 is reset by the reset pulse to be loaded with the maximum value $FF_H$ (11111111). Thus, the detector 41 detects the minimum path metric for each data symbol.

The subtractor 51 comprises an adder 511, a latch 514 and a complementary number generator which includes an inverter 512 and an adder 513. The subtractor 51 subtracts the minimum path metric from the maximum path metric. Suppose that the maximum and minimum path metrics 5 and 3 are outputted from the maximum and minimum path metric detectors 31 and 41, respectively. The inverter 512 inverts 3 (00000011) into (11111100). The adder 513 adds the inverted data (11111100) and $01_H$ (00000001) to produce the complementary number (11111101) of 3. The adder 511 adds the complementary number (11111101) and 5 (00000101) to produce an added output (100000010). Since the adder 511 has an 8-bit output, the most significant bit (MSB) of the added output is discarded. Thus, the adder 511 produces the subtracted number 2 (00000010).

The output of addder 511 is provided to the latch 514 which in response to the reset pulse, latches that output at the end of each data symbol. Thus, the subtracted output is provided to the minimum path metric difference ($PMD_{MIN}$) detector 61 per data symbol. $PMD_{MIN}$ detector 61 comprises an 8-bit magnitude comparator 611, a data selector 612 and a buffer 613. Like the minimum path metric detector 41, the detector 61 detects the minimum difference between the maximum and minimum path metric respectively detected by the maximum and minimum path metric detectors 31 and 41. The buffer 613 is reset by the header detect pulse to be loaded with the maximum value $FF_H$ (11111111). Thus, the detector 61 outputs the minimum path metric difference $PMD_{MIN}$ for data of 52 bits. $PMD_{MIN}$ is provided to the interference detector 18 (FIG. 2).

Each of 8-bit magnitude comparators 311, 411 and 611 may be comprised of two µPD74HC85s. Each of data selectors 312, 412 and 614 may be comprised of two µPD74HC257s. Each of buffers 313, 413 and 613 may be comprised of µPD74HC574. Each of adders 511 and 513 may be comprised of 74HC283. The inverter 512 may be made of µPD74HC240. All the above-mentioned integrated circuits (ICs) are manufactured and marketed by NEC.

Figure 6:
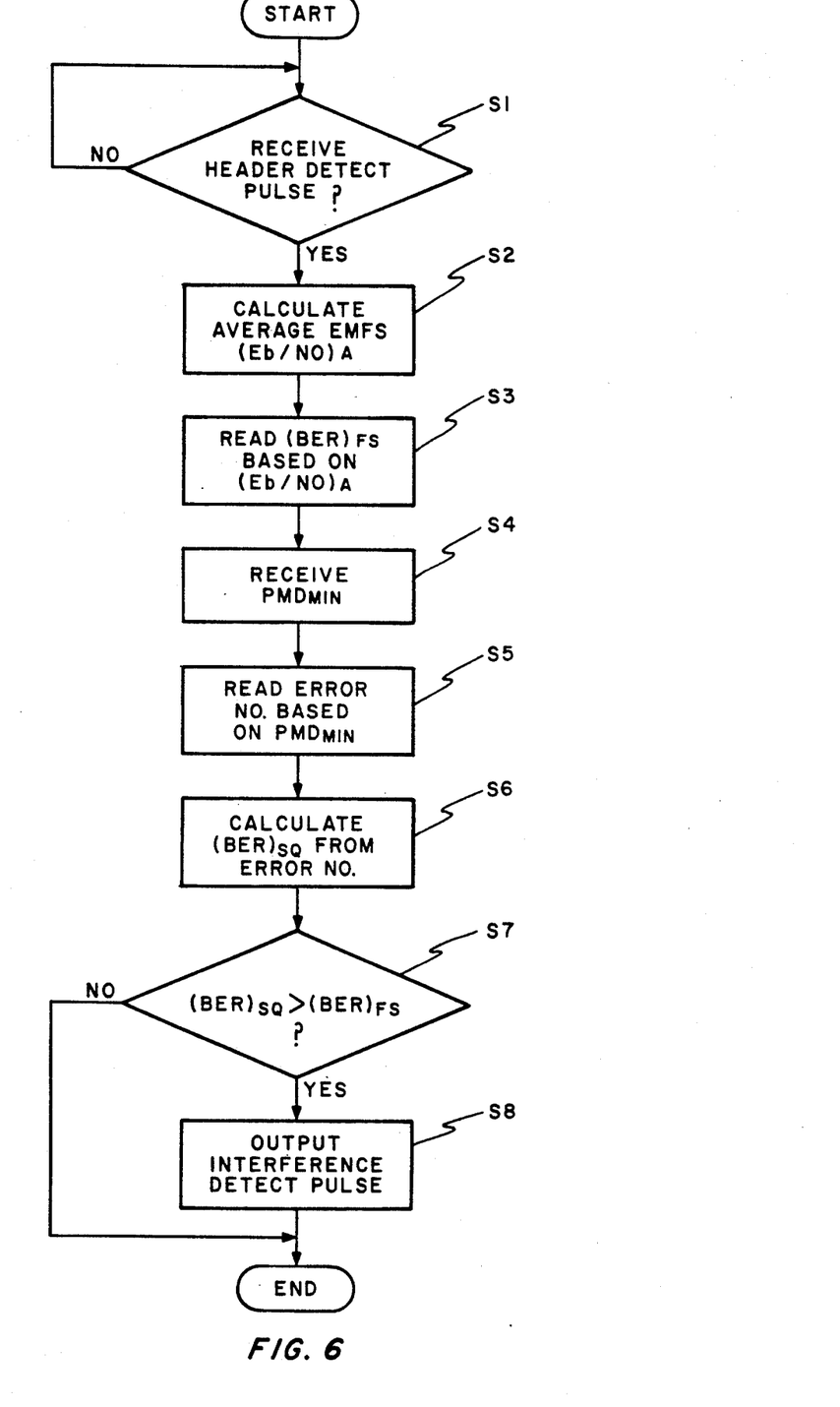
FIG. 6 is a flow chart demonstrating the operation of an interference detector in FIG. 2.

Next, the operation of interference detector 18 will be described referring to FIG. 6. If the interface detector 18 receives the header detect pulse at step S1, the detector 18 moves on to step S2 at which it calculates an average electromagnetic field strength $(Eb/No)_A$ for data period of 51 bits based on the output of EMFS detector 21. The detector 18 reads out of the FIG. 9 table a bit error ratio $(BER)_{FS}$ corresponding to the field strength $(Eb/No)_A$ at step S3.

At step S4, the detector 18 receives $PMD_{MIN}$ from the detector 61 (FIG. 5). The detector 18 reads out of the FIG. 8 table the number of bit errors which corresponds to the received $PMD_{MIN}$ at steps S5. The detector 18 calculates at step S6 a bit error ratio $(BER)_{SQ}$ indicating the signal quality of the received data by dividing the number of bits error by the number of data bits 104. The detector 18 compares $(BER)_{SQ}$ and $(BER)_{FS}$ at step S7 and if $(BER)_{SQ}$ is greater than $(BER)_{FS}$, the detector 18 goes on to step S8. Otherwise, the operation ends. At step S8, the detector 18 outputs an interference detect pulse indicating that interference exists. The interference detect pulse is provided to the signal controller 17. It is to be noted that $(BER)_{SQ}$ may be compared with a predetermined set value instead of $(BER)_{FS}$ at step S7. In this case, EMFS detector 21 need not be provided in the apparatus 10 (FIG. 2).

Figure 7:
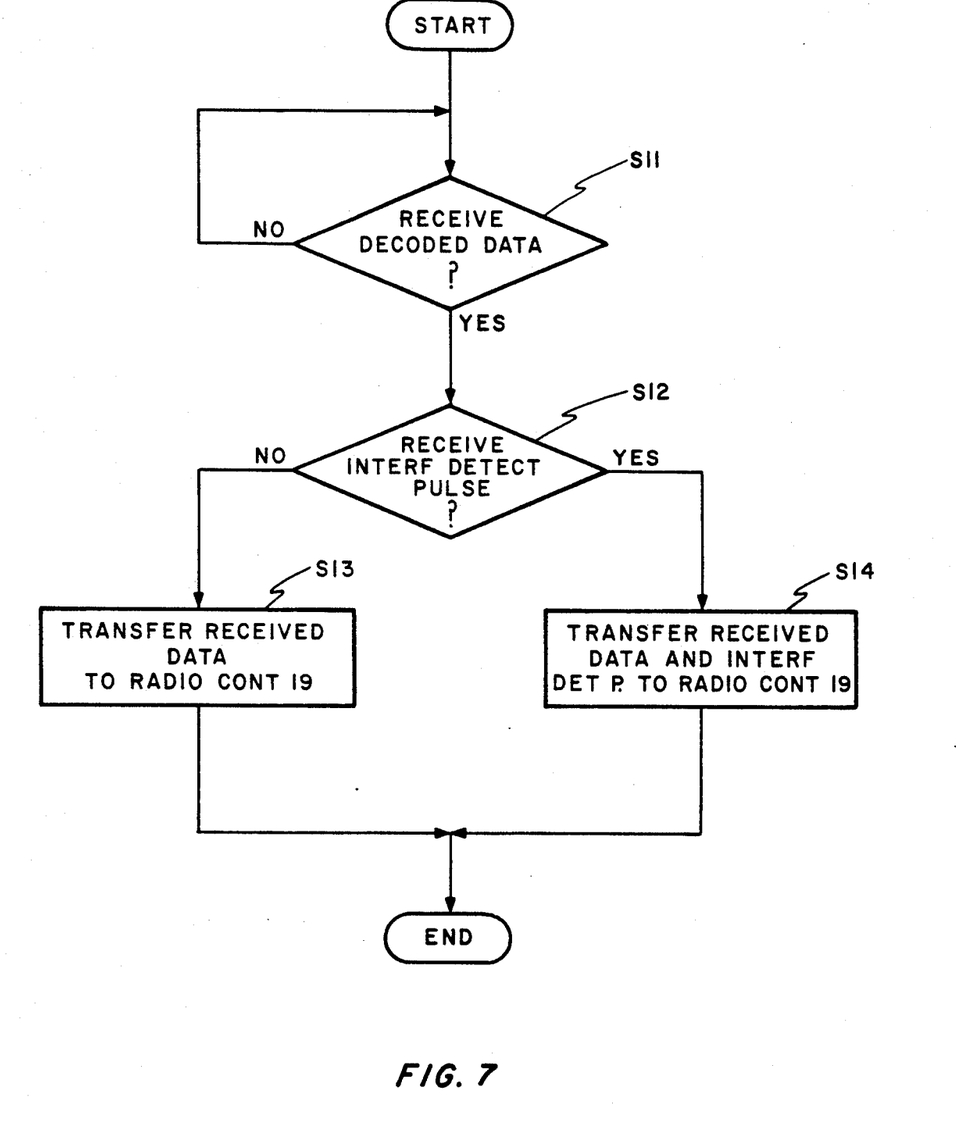
FIG. 7 is a flow chart demonstrating the operation of a signal controller 17 in FIG. 2.

The operation of signal controller 17 will now be described referring to FIG. 7. At step S11, the controller 17 check if there is decoded data from the Viterbi decoder 15. If yes, the controller 17 sees at step S12 if the interference detect pulse is provided from the interference detector 18. If no, the controller 17 transfers the decoded data to the radio control circuit 19. Otherwise, the controller 17 transfers both the decoded data and the interference detect pulse to the radio control circuit 19. As mentioned earlier, if the control circuit 19 receives the interference detect pulse, it performs the channel change operation.

Figure 10:
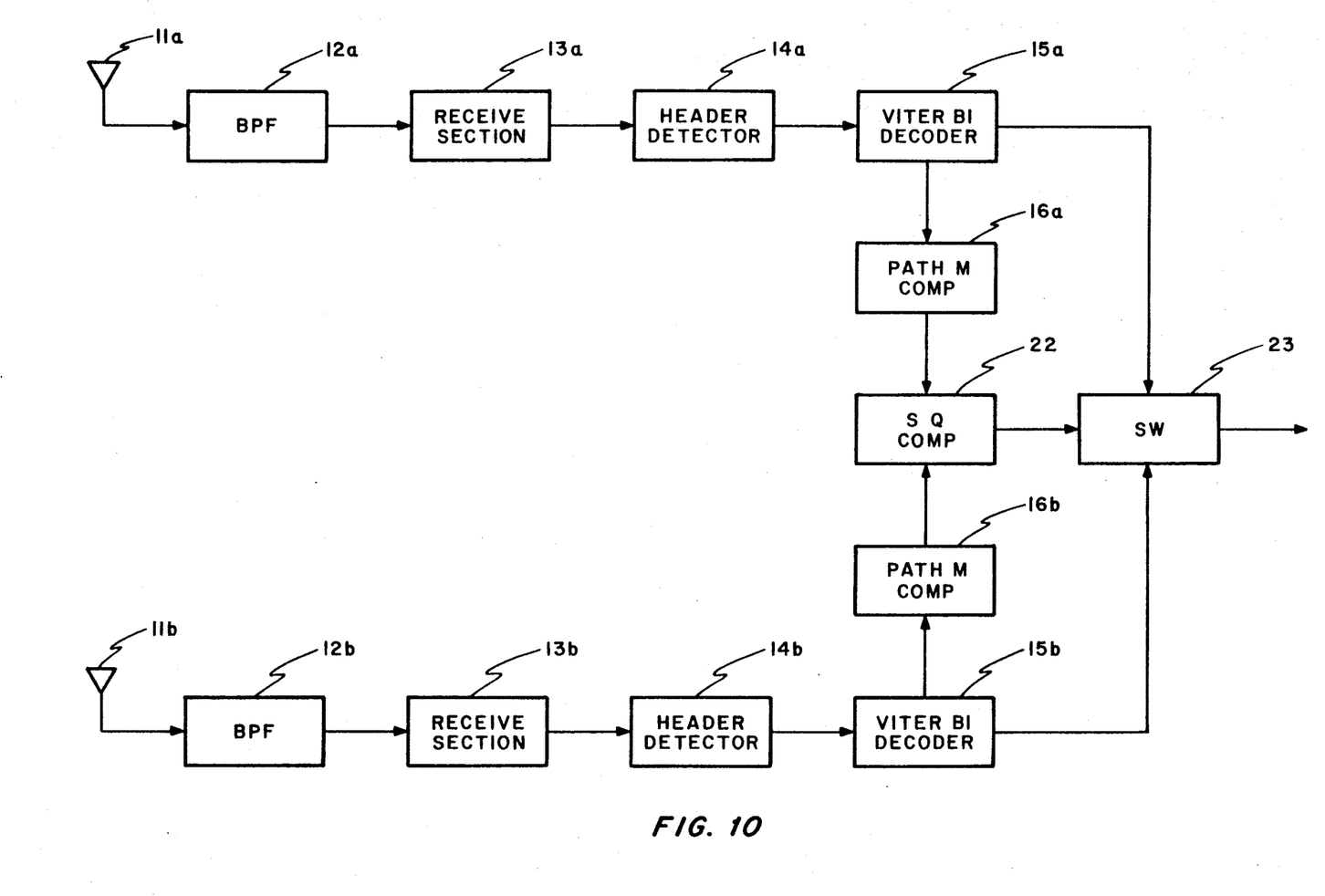
FIG. 10 is a block diagram showing an antenna diversity appararus embodying the present invention.

In FIG. 10, the present invention is applied to an antenna diversity apparatus 100. The apparatus 100 includes antennas 11a and 11b, BPFs 12a and 12b, receive sections 13a and 13b, header detectors 14a and 14b, Viterbi decoders 15a and 15b and path metric comparators 16a and 16b. These elements have the same structures as their counterparts in FIG. 2, respectively, and thus their detailed description should not be provided in this specification. Both the outputs $PMD_{MIN}$ of path metric comparators 16a and 16b are supplied to a signal quality (SQ) comparator 22. The comparator 22 compares two $PMD_{MIN}$ to select the better one of them. In response to the output of SQ comparator 22, a switch circuit 23 selects one of decoded data from the Viterbi decoders 15a and 15b.

What is claimed is:

1. An interference detection apparatus comprising:
   receiver means for receiving and demodulating a radio signal including convolutionally coded data to produce demodulated data;
   decoder means for decoding said demodulated data and producing path metrics for said convolutionally coded data;
   comparator means responsive to said path metrics for selecting a minimum difference from differences between maximum ones of said path metrics and minimum ones of said path metrics;
   detector means responsive to said minimum difference for determining a signal quality of said demodulated data, said detector means comprising means responsive to said minimum difference for determining a first bit error ratio corresponding to said minimum difference;
   means for detecting an electromagnetic field strength of said radio signal to produce an EMFS signal;
   means responsive to said EMFS signal for determining a second bit error ratio corresponding to said electromagnetic field strength; and
   means for comparing said first and second bit error ratios and producing an interference detect pulse if said first bit error ratio is greater than said second bit error ratio.

2. An apparatus as claimed in claim 1, wherein said comparator means comprises:
   maximum detector means for detecting said maximum path metric from said path metrics for each data symbol;
   minimum detector means for detecting said minimum path metric from said path metrics for each data symbol;

subtracter means for subtracting said minimum path metric from said maximum path metric for each data symbol; and minimum difference detector means for detecting said minimum difference from the output of said subtracter means.

3. An apparatus as claimed in claim 2, wherein said maximum detector means comprises:

first magnitude comparator means for comparing each of said path metrics with a first buffer output for one data symbol to produce a first select signal;

first data selector means responsive to said first select signal for selecting the bigger one of each of said path metrics and said first buffer output to produce an output as the output of said maximum detector means; and first buffer means for storing the output of said first data selector means and providing the stored output to said first magnitude comparator as said first buffer output, said first buffer means being reset at the end of each data symbol, and wherein said minimum detector means comprises:

second magnitude comparator means for comparing each of said path metrics with a second buffer output for one data symbol to produce a second select signal;

second data selector means responsive to said second select signal for selecting bigger one of each of said path metrics and said second buffer output to produce an output as the output of said minimum detector means; and second buffer means for storing the output of said second data selector means and providing the stored output to said second magnitude comparator as said second buffer output, said second buffer means being reset at the end of each data symbol.

4. An apparatus as claimed in claim 3, wherein said subtracter means comprises:

complimentary number generator means responsive to the output of said second data selector means for generating a complimentary number of said minimum path metric;

adder means for adding said maximum path metric and said complimentary number to produce a subtracted number; and latch means for latching said substracted number at the end of each data symbol to produce an output as the output of said subtracter means.

5. An apparatus as claimed in claim 2, wherein said minimum difference detector means comprises:

magnitude comparator means for comparing each of the outputs of said subtractor means with a buffer output to produce a select signal;

data selector means responsive to said select signal for selecting the bigger one of each of the outputs of said subtracter means and said buffer output to produce an output as the output of said minimum difference detector means; and buffer means for storing the output of said data selector means and providing the stored output to said magnitude comparator means as said buffer output, said buffer means being reset at the beginning of said demodulated data.

6. An apparatus as claimed in claim 1, wherein said decoder means comprises a Viterbi decoder.

7. An apparatus comprising:

receiver means for receiving and demodulating a radio signal including convolutionally coded data to produce baseband data;

decoder means for decoding said baseband data and decoding the received data to produce decoded data and providing path metrics;

comparator means responsive to said path metrics for determining a signal quality of said decoded data;

detector means responsive to said quality for producing a detect signal when said signal quality falls below a predetermined value;

field strength detector means for detecting an electromagnetic field strength of said radio signal to produce an EMFS signal; and means for changing said predetermined value in accordance with said EMFS signal.

8. An apparatus as claimed in claim 7, further comprising means responsive to said detect signal for changing a radio channel of said receiver means.

9. An apparatus as claimed in claim 7, wherein said comparator means comprises:

first detector means for selecting a miximum one from said path metrics;

second detector means for selecting a minimum one from said path metrics;

subtractor means for subtracting said minimum path metric from said maximum path metric to produce a subtracted path metric; and detecting means responsive to said subtracted path metric for detecting said signal quality.

10. An apparatus as claimed in claim 9, wherein said detecting means comprises:

means for storing in advance a table indicating a signal quality vs. subtracted path metric characteristic; and means for reading out of said table a signal quality corresponding to said subtracted path metric to produce an output as the output of said detecting means.

11. An apparatus as claimed in claim 7, wherein said decoder means comprises a Viterbi decoder.

12. An interference detection apparatus installed in a mobile subscriber station which is to be connected to a mobile base station through a radio channel, said apparatus comprises:

receiver means for receiving and demodulating a radio signal including convolutionally coded data to produce baseband data;

decoder means for receiving said baseband data and decoding the received data to produce decoded data and providing path metrics;

comparator means responsive to said path metrics for determining a signal quality of said decoded data;

detector means responsive to said signal quality for producing in interference detect signal when said signal quality falls below a predetermined value;

transmitter means for transmitting said interference detect pulse to said mobile base station;

field strength detector for detecting an electromagnetic field strength of said radio signal to produce an EMFS signal; and means for changing said predetermined value in accordance with said EMFS signal.

13. An apparatus as claimed in claim 12, wherein said decoder means comprises a Viterbi decoder.

14. An interference detection apparatus installed in a mobile base station which is connected to a public switched telephone network and is to be connected to a mobile subscriber station through a radio channel, said apparatus comprises:

receiver means for receiving and demodulating a radio signal including convolutionally coded data to produce baseband data;

decoder means for receiving said baseband data and decoding the received data to produce data and providing path metrics;

comparator means responsive to said path metrics for determining a signal quality of said decoded data;

detector means responsive to said signal quality for producing an interference detect signal when said signal quality falls below a predetermined value;

radio control means responsive to said interference detect signal for changing a radio channel of said receiver means;

field strength detector means for detecting an electromagnetic field strength of said radio signal to produce an EMFS signal; and means for changing said predetermined value in accordance with said EMFS signal.

15. An apparatus as claimed in claim 14, wherein said decoder means comprises a Viterbi decoder.

16. An apparatus comprising:

first receiver means for receiving and demodulating a first radio signal including convolutionally coded data to produce first baseband data containing more than two bits;

first header detector means for detecting said first header out of said first radio signal to produce a first header detect signal;

first Viterbi decoder means for receiving said first baseband data and decoding the received data to produce a first decoded data and providing a first set of path metrics;

first comparator means responsive to said first set of path metrics for determining a first quality of said first decoded data, said first comparator means being reset by said first header detect signal;

second receiver means for receiving and demodulating a second radio signal including a second header followed by convolutionally coded data to produce second baseband data containing more than two bits;

second header detector means for detecting said second header out of said second radio signal to produce a second header detect signal;

second Viterbi decoder means for receiving said second baseband data and decoding the received data to produce second decoded data and providing a second set of path metrics;

second comparator means responsive to said second set of path metrics for determining a second signal quality of said second decoded data, said second comparator means being reset by said second header detect signal;

third comparator means for comparing said first and second signal qualities to produce a first switch signal when said first signal quality is better than said second signal quality and a second switch signal when said second signal quality is better than said first signal quality; and switch means for selecting first decoded data in response to said first switch signal and selecting said second decoded data in response to said second switch signal.

17. An apparatus as claimed in claim 16, wherein each of said first and second comparator means comprises:

maximum detector means for detecting a maximum path metric from said path metrics for each data symbol;

minimum detector means for detecting a minimum path metric from said path metrics for each data symbol;

subtractor means for subtracting said minimum path metric from said maximum path metric for each data symbol; and minimum difference detector means for detecting a minimum path metric difference from the output of said subtracter means.

18. An apparatus comprising:

first and second antennas each picking up first and second radio signals;

first and second receivers respectively connected to said first and second antennas for respectively receiving and demodulating said first and second radio signals to produce first and second demodulated baseband signals respectively including first and second headers respectively followed by first and second convolutionally coded data each of which contains more than two bits;

first and second header detectors for detecting said first and second headers to produce first and second header detect pulses, respectively;

first and second Viterbi decoders for respectively decoding said first and second demodulated baseband signals to produce first and second decoded data and respectively providing first and second sets of path metrics;

first and second path metric comparators responsive to said first and second sets of path metrics for respectively determining first and second signal qualities of said first and second demodulated baseband signals, said first and second path metric comparators being reset by said first and second header detect pulses, respectively; and control means responsive to said first and second signal qualities for selecting one of the outputs of said first and second Viterbi decoders.

19. An apparatus as claimed in claim 18, wherein said control means comprises:

a signal quality comparator for comparing said first and second signal qualities to produce a first switch signal when said first signal quality is better than said second signal quality and a second switch signal when said second signal quality is better than said first signal quality; and a switch circuit for selecting the output of said first Viterbi decoder in response to said first switch signal and selecting the output of said second Viterbi decoder in response to said second switch signal.

20. A method of detecting a signal quality of a received radio signal, comprising the following steps of:

receiving and demodulating a radio signal including convolutionally coded data to produce baseband data;

decoding said baseband data and producing path metrics for said baseband data;

responsive to said path metrics, determining a signal quality of said radio signal;

producing a detect signal when said signal quality falls below a predetermined value;

detecting the electromagnetic field strength of said radio signal to produce an EMFS signal; and changing said predetermined value in accordance with said EMFS signal.

21. A method as claimed in claim 20, wherein said decoding step comprises the step of decoding said baseband data in accordance with the Viterbi algorithm.

22. A method of detecting interference with a radio signal on a radio channel between a mobile base station and a mobile subscriber station, said method comprising the following steps of:
    receiving said radio signal to produce a received radio signal;
    decoding said received radio signal and producing path metrics;
    detecting an electromagnetic field strength associated with said radio signal; and
    responsive to said path metrics and to said field strength, detecting interference with said radio signal to produce a detect signal.

23. A method as claimed in claim 22, further comprising the step of, responsive to said detect signal, changing said radio channel to another radio channel.

24. A method as claimed in claim 22, wherein said decoding step comprises the step of decoding said received radio signal in accordance with the Viterbi algorithm.

25. A method of determining a signal quality of a radio signal including convolutionally coded data, said method comprising the steps of:
    receiving and demodulating said radio signal to produce demodulated data;
    decoding said demodulated data to produce decoded data using the Viterbi algorithm;
    providing path metrics by means of said Viterbi algorithm;
    responsive to said path metrics, selecting a minimum difference from differences between maximum ones of said path metrics and minimum ones of said path metrics for one data symbol of said decoded data;
    responsive to said minimum difference, determining a signal quality of said radio signal, said determining step comprising the step of determining a first bit error ratio corresponding to said minimum difference;
    detecting an electromagnetic field strength of said radio signal;
    determining a second bit error corresponding to said electromagnetic field strength; and
    comparing said first and second bit error ratios to produce an interference detect signal when said first bit error ratio is greater than said second bit error ratio.

26. A method of selecting one of first and second radio signals picked up by first and second antennas, respectively, said method comprising the following steps of:
    respectively demodulating said first and second radio signals to produce first and second baseband data respectively including first and second headers respectively followed by first and second convolutionally coded data each of which contains more than two bits;
    detecting said first and second headers to produce first and second header detect pulses, respectively;
    respectively decoding said first and second baseband data through the Viterbi algorithm to produce first and second decoded data;
    respectively producing from said first and second baseband data first and second sets of path metrics through said Viterbi algorithm, the production of said first and second sets of path metrics being reset by said first and second header detect pulses, respectively;
    responsive to said first and second sets of path metrics, respectively determining first and second signal qualities respectively associated with said first and second decoded data;
    comparing said first and second signal qualities to produce a switch control signal indicating which signal quality is better than the other; and
    responsive to said switch control signal, selectively passing one of said first and second decoded data.

27. A method as claimed in claim 26, wherein each of said determining steps comprises the steps of:
    detecting a maximum path metric from said path metrics for each data symbol;
    detecting a minimum path metric from said path metrics for each data symbol;
    subtracting said minimum path metric from said maximum path metric for each data symbol to produce subtracted path metrics for said decoded data;
    responsive to said subtracted path metrics, detecting a minimum path metric difference; and
    responsive to said minimum path metric difference, calculating said signal quality.

28. A method as claimed in claim 27, wherein said calculating step comprises the steps of:
    storing beforehand a table indicating a minimum path metric difference vs. the number of bit errors characteristic;
    reading out of said table bit errors respectively corresponding to said minimum path metric differences; and
    responsive to the read-out bit errors, determining said signal qualities.

* * * * *